J. T. QUIGLEY.
TAPE CARRIER.
APPLICATION FILED FEB. 19, 1912.

1,249,191.

Patented Dec. 4, 1917.

WITNESSES
H.J. Pint.
H.A. Scholten

INVENTOR
JOHN T. QUIGLEY
BY Miller & White
HIS ATTORNEYS

UNITED STATES PATENT OFFICE.

JOHN T. QUIGLEY, OF SAN FRANCISCO, CALIFORNIA, ASSIGNOR, BY MESNE ASSIGNMENTS, TO COSTMETER COMPANY, OF BOSTON, MASSACHUSETTS, A CORPORATION OF MASSACHUSETTS.

TAPE-CARRIER.

1,249,191. Specification of Letters Patent. Patented Dec. 4, 1917.

Application filed February 19, 1912. Serial No. 678,675.

*To all whom it may concern:*

Be it known that I, JOHN T. QUIGLEY, a citizen of the United States, and a resident of the city and county of San Francisco and State of California, have invented certain new and useful Improvements in Tape-Carriers, of which the following is a specification.

The invention relates to means for carrying or advancing tapes or ribbons for any desired purpose, and especially in recording and calculating machines where it is desirable to positively advance the tapes or ribbons.

The object of the invention is to provide means for positively advancing the tape with the least expenditure of power.

A further object of the invention is to provide means for advancing the tape a distance equal to the movement of the surface of the carrier.

A further object of the invention is to provide means for preventing the tape from slipping or creeping on the carrier.

The invention possesses other advantageous features, which with the foregoing will be set forth at length in the following description where I shall outline in full that form of embodiment of the invention which I have selected for illustration in the drawings accompanying and forming part of the present specification. The novelty of the invention will be included in the claims succeeding said description. From this it will be apparent that I do not restrict myself to the showing made by such drawings and description, as I may adopt many variations within the scope of my invention as expressed in said claims.

Referring to the drawings.

Figure 1:
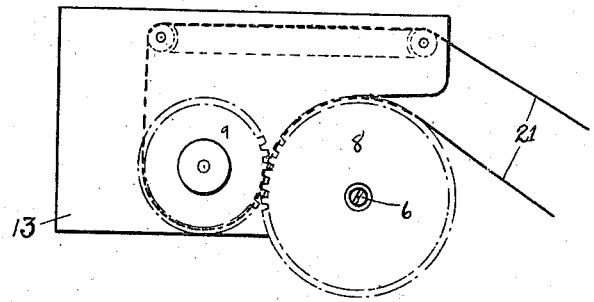
Figure 1 is a front view of the device showing the carrying frame.
Figure 2:
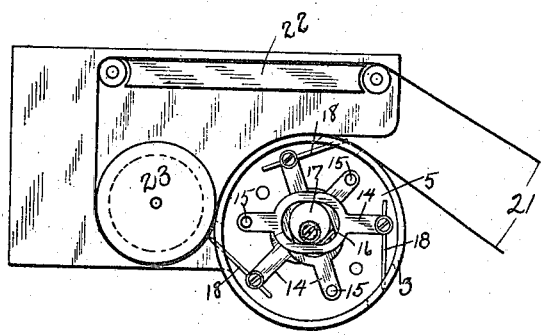
Fig. 2 is a similar view with the front plate of the frame and the front plate of the carrier wheel removed, showing the platen and the interior of the carrier wheel.
Figure 3:
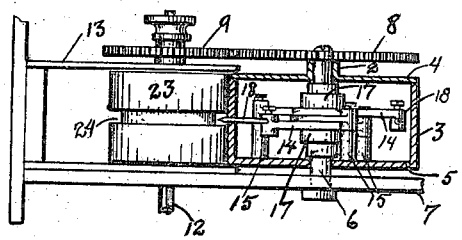
Fig. 3 is a top view of the device showing it attached to the frame of the machine, the platen and part of the carrying frame being removed and the carrier wheel being shown in section.

The device is particularly adapted to be used in time-cost recording and calculating machines such as shown in my application Ser. No. 488,162 filed April 6, 1909, wherein the tape is to be moved by a clock spring or similar mechanism, the power of which is limited. In such machines the length of tape advanced indicates the elapsed time or the money value of such time and the movement of the tape must exactly correspond to the movement of the carrier wheel. The tape is positively advanced by means of pins in the carrier wheel and when these pins are fixed in the wheel I find that considerable power is necessary to perforate the tape and to force the tape down on the pins. I also find that with fixed pins, the tape has a tendency to buckle on the carrier wheel and not lie flat against the surface due to the difference in length between the tangent drawn through the point of the pin and the corresponding arc, so that the length of tape advanced is not strictly in accord with the distance that the surface of the carrier has moved. To overcome these difficulties I arranged the pins so that they are movable relative to the wheel and project from and are withdrawn from the surface of the wheel at the proper time. By arranging the pins at an angle to the surface of the wheel, I also cause the tape to be drawn against the surface of the carrier.

The carrier wheel consists of a hollow cylinder 3 having front and rear faces 4—5. The cylinder is mounted on the fixed shaft 6 which is supported in a suitable part of the frame 7 of the machine. The cylinder is revolved on the shaft 6 by means of the gear 8 attached to the flange or neck 2 on front plate 4 which meshes with a gear 9 on the driving shaft 12 which is supported in the frame 13. The driving shaft is generally actuated by a clock spring or similar mechanism and rotated at the required speed.

Within the cylinder 3 are a plurality of levers 14 fulcrumed on posts 15 attached to the rear plate 5 and having a central slotted portion 16 engaging a cam 17 fixed on the fixed shaft 6. Secured to the outer ends of the levers 14 are the pins 18, which preferably lie at substantially a right angle to the levers and are adjustably attached thereto.

The outer ends of the levers are offset properly so that the pins are alined circumferentially, this being necessary on account of the fact that the levers lie adjacent each other.

As the cylinder is revolved, and the cam 17 remains stationary it is evident that the outer end of levers 14 and consequently the pins 18, move relatively to the cylinder. The cylinder is provided with apertures in line with the pins and the pins are secured to the levers in such position that in the forward position of the lever the pin projects from the face of the cylinder and in the backward position the pins are drawn below the surface.

The tape or tapes 21, after passing over a platen 22 or other printing or marking surface pass around the roller 23 attached to the shaft 12, and thence over the carrier wheel. The roller 23 is provided with a circumferential groove 24 alined with the pins 18, so that the pins may readily perforate the tapes. The cam 17 is placed so that the pin is moved to project from the face of the cylinder as it approaches the tape lying on the roller 23 which point is slightly in advance of the point of tangency of the roller and the cylinder. At this point the pin lies substantially at right angles to the tape and perforates it readily. The pin continues to advance outwardly until it passes the point of tangency of the roller and wheel at which point the tape is well seated on the pin and since the pin lies at an acute angle to the tape, the tape is drawn down so that it lies perfectly flat on the wheel.

After the wheel has moved through the required angle the pin is withdrawn from the tape, obviating the use of any stripping means for removing the tape from the pins.

The number of levers 14 depends upon the arc through which the tape is in engagement with the wheel, but the number of levers should be such that the tape is always engaged by one pin.

I claim:

1. A tape carrier comprising a feeding and measuring cylinder, a fixed shaft on which said cylinder is rotatable, a cam fixed on said shaft within said cylinder and a plurality of pins operably connected to said cam, so that the rotation of the cylinder causes a movement of the pins relative to the surface of the cylinder.

2. A tape carrier comprising a feeding and measuring cylinder, a fixed shaft on which said cylinder is rotatable, a cam fixed on said shaft, a plurality of slotted levers fulcrumed to said cylinder and engaging and embracing said cam and pins projecting from the free end of said levers, said pins being adapted to engage the tape.

3. A tape measuring and feeding device comprising a feeding and measuring cylinder, a fixed shaft carrying an eccentric cam, said cylinder being rotatable about the axis of said shaft, a plurality of levers fulcrumed each on the walls of the cylinder and at one side of the shaft and having each a centrally slotted portion embracing and engaging the cam, a pin carried by the opposite end of each lever and adapted to be projected through an aperture in the surface of the cylinder and retracted therefrom once for each revolution, the ends of the levers being offset to aline the pins circumferentially, and a roller facing the cylinder and adapted to press an uncut portion of the tape against the surface thereof.

4. A tape measuring and feeding device comprising a feeding and measuring cylinder, a fixed shaft carrying an ecentric cam, said cylinder being rotatable about the axis of said shaft, a plurality of levers fulcrumed each on the walls of the cylinder and at one side of the shaft and having each a centrally slotted portion embracing and engaging the cam, a pin carried by the opposite end of each lever and adapted to be projected through an aperture in the surface of the cylinder and retracted therefrom once for each revolution.

5. In a tape feeding mechanism, the combination with a feeding cylinder adapted to feed a continuous uncut length of tape, of a plurality of impaling points carried by the periphery of the cylinder and inclined in the direction of the movement of the tape and adapted to impale the tape, a tape guide in operative relation to the cylinder, said guide having a point receiving recess and being so located as to cause the impaling points to puncture the tape and simultaneously enter the recess, whereby the tape is held by the guide at and about the impaling point when punctured at a fixed distance from the center of the feeding cylinder.

6. In a tape feeding mechanism, the combination with a feeding cylinder adapted to feed a continuous uncut length of tape, of a plurality of movable impaling points carried by the periphery of the cylinder and inclined in the direction of the movement of the tape and adapted to impale the tape, a tape guide in operative relation to the cylinder, said guide having a point receiving recess and being so located as to cause the impaling points to puncture the tape and simultaneously enter the recess, whereby the tape is held by the guide at and about the impaling point when punctured at a fixed distance from the center of the feeding cylinder.

7. In a tape feeding mechanism, the combination with a feeding cylinder adapted to feed a continuous uncut length of tape, of a plurality of impaling points movable outwardly from the surface of the drum to an impaling position as they approach the tape, a tape guide in operative relation to the cylinder, said guide having a point receiving recess and being so located as to cause the impaling points to puncture the tape and simultaneously enter the recess, whereby the tape is held by the guide at and about the impaling point when punctured at a fixed distance from the center of the feeding cylinder.

8. In a tape feeding mechanism, the combination with a feeding cylinder adapted to feed a continuous uncut length of tape, a plurality of impaling points carried by the periphery of the cylinder and inclined in the direction of movement of the tape and adapted to impale the tape, a grooved guide in operative relation to the cylinder, said guide being located to cause the impaling point to puncture the tape and simultaneously enter the groove whereby the tape is held when punctured at and about the impaling point at a fixed distance from the center of the feeding cylinder.

9. In a tape feeding mechanism, the combination with a feeding cylinder adapted to feed a continuous uncut length of tape, a plurality of impaling points carried by the periphery of the cylinder and inclined in the direction of movement of the tape and adapted to impale the tape, a grooved guide roller in operative relation to the cylinder, said guide being located to cause the impaling point to puncture the tape and simultaneously enter the groove whereby the tape is held when punctured at and about the impaling point at a fixed distance from the center of the feeding cyinder.

10. In a tape feeding mechanism the combination with a rotary tape feeding member adapted to feed a continuous, uncut length of tape, of a plurality of impaling points carried by said member and inclined in the direction of rotation thereof and adapted to impale the tape, and a tape guide in operative relation to the feeding member and so located as to hold the tape pressed against the face of the guide and at a fixed distance from the axis of the tape feeding member at the time the tape is punctured by an impaling point.

In testimony whereof, I have hereunto set my hand at San Francisco, California, this 13th day of February 1912.

JOHN T. QUIGLEY.

In presence of—
 H. G. PROST,
 R. HEFFERNAN.

Copies of this patent may be obtained for five cents each, by addressing the "Commissioner of Patents, Washington, D. C."